US012634045B2

(12) United States Patent (10) Patent No.: US 12,634,045 B2
Liu (45) Date of Patent: May 19, 2026

(54) METHOD, APPARATUS AND COMMUNICATION DEVICE FOR TRANSMITTING HARQ FEEDBACK INFORMATION

(71) Applicant: Beijing Xiaomi Mobile Software Co., Ltd., Beijing (CN)

(72) Inventor: Yang Liu, Beijing (CN)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 341 days.

(21) Appl. No.: 18/270,381

(22) PCT Filed: Dec. 31, 2020

(86) PCT No.: PCT/CN2020/142423
§ 371 (c)(1),
(2) Date: Jun. 29, 2023

(87) PCT Pub. No.: WO2022/141524
PCT Pub. Date: Jul. 7, 2022

(65) Prior Publication Data
US 2024/0097829 A1 Mar. 21, 2024

(51) Int. Cl.
*H04L 1/1812* (2023.01)
*H04L 1/1829* (2023.01)

(52) U.S. Cl.
CPC .......... *H04L 1/1812* (2013.01); *H04L 1/1864* (2013.01)

(58) Field of Classification Search
CPC .... H04L 1/1812; H04L 1/1864; H04L 1/1861
See application file for complete search history.

(56) References Cited

U.S. PATENT DOCUMENTS

2016/0081077 A1* 3/2016 Li ........................ H04L 1/1854
370/280
2019/0141727 A1* 5/2019 Si ........................ H04L 1/1896
(Continued)

FOREIGN PATENT DOCUMENTS

CN 106301670 A 1/2017
CN 107347002 A 11/2017
(Continued)

OTHER PUBLICATIONS

European Patent Office, Extended European Search Report Issued in Application No. 20967862.2, Nov. 8, 2023, Germany, 8 pages.
(Continued)

*Primary Examiner* — Dady Chery
(74) *Attorney, Agent, or Firm* — Volpe Koenig

(57) ABSTRACT

The present disclosure provides a method, apparatus, and communication device for transmitting HARQ feedback information to improve utilization of a wireless network. The utilization is improved by: receiving a configuration indication message transmitted by a base station, where the configuration indication message indicates one or a plurality of uplink resources for the HARQ feedback information; selecting one or more target uplink resources from the one or the plurality of uplink resources according to the configuration indication message; and feeding the HARQ feedback information to the base station through the one or more target uplink resources.

15 Claims, 5 Drawing Sheets

Receive a configuration indication message transmitted by a base station, where the configuration indication message indicates one or a plurality of uplink resources for the HARQ feedback information ⟋201

Select one or more target uplink resources from the one or the plurality of uplink resources according to the configuration indication message ⟋202

Feed the HARQ feedback information to the base station through the one or more target uplink resources ⟋203

(56)                  References Cited

U.S. PATENT DOCUMENTS

| | | | | |
|---|---|---|---|---|
| 2019/0246432 A1* | 8/2019 | Hosseini | ........... | H04W 74/0816 |
| 2020/0077376 A1* | 3/2020 | Kim | ....................... | H04W 72/21 |
| 2020/0351866 A1* | 11/2020 | Park | ....................... | H04L 1/1864 |
| 2020/0374089 A1* | 11/2020 | Yang | ..................... | H04L 5/0053 |

FOREIGN PATENT DOCUMENTS

| | | |
|---|---|---|
| CN | 107359969 A | 11/2017 |
| CN | 109496398 A | 3/2019 |
| CN | 109560898 A | 4/2019 |
| CN | 110034861 A | 7/2019 |
| CN | 110226315 A | 9/2019 |
| CN | 111262663 A | 6/2020 |
| CN | 111262670 A | 6/2020 |
| CN | 111726204 A | 9/2020 |
| WO | 2019/137481 A1 | 7/2019 |
| WO | 2020/051754 A1 | 3/2020 |
| WO | 2020/164358 A1 | 8/2020 |

OTHER PUBLICATIONS

ISA State Intellectual Property Office of the People's Republic of China, International Search Report Issued in Application No. PCT/CN2020/142423, Sep. 24, 2021, WIPO, 4 pages.

State Intellectual Property Office of the People's Republic of China, Office Action and Search Report Issued in Application No. 2020800043424, Aug. 23, 2023, 21 pages.

ISA State Intellectual Property Office of the People's Republic of China, Written Opinion of the International Searching Authority Issued in Application No. PCT/CN2020/142423, Sep. 24, 2021, WIPO, 9 pages.

* cited by examiner

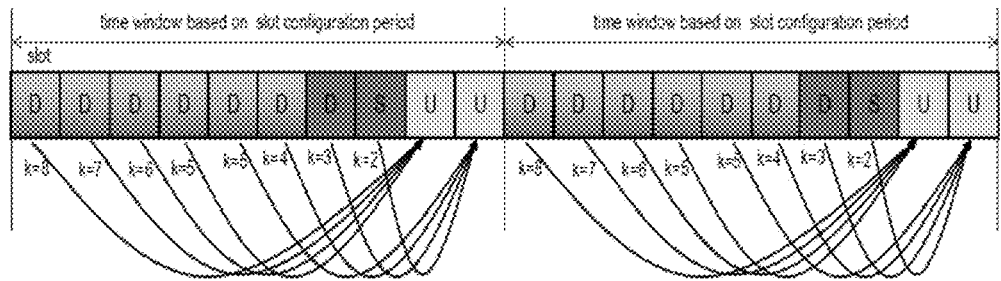

FIG. 1(a) (Prior Art)

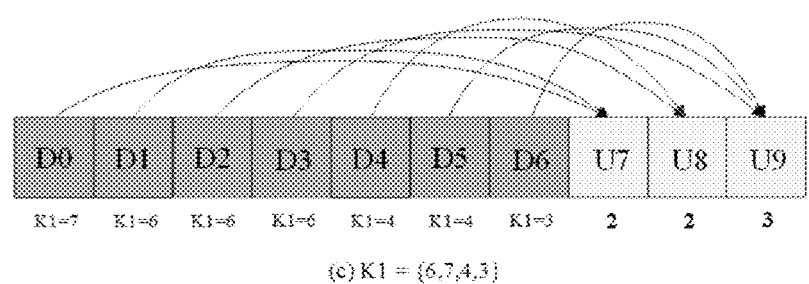

Receive a configuration indication message transmitted by a base station, where the configuration indication message indicates one or a plurality of uplink resources for the HARQ feedback information   /201

Select one or more target uplink resources from the one or the plurality of uplink resources according to the configuration indication message   /202

Feed the HARQ feedback information to the base station through the one or more target uplink resources   /203

FIG. 2

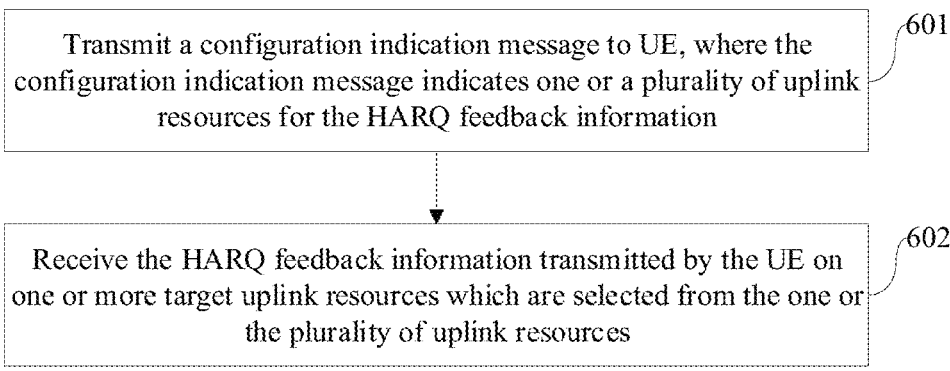

Transmit a configuration indication message to UE, where the configuration indication message indicates one or a plurality of uplink resources for the HARQ feedback information ⟋601

Receive the HARQ feedback information transmitted by the UE on one or more target uplink resources which are selected from the one or the plurality of uplink resources ⟋602

FIG. 6

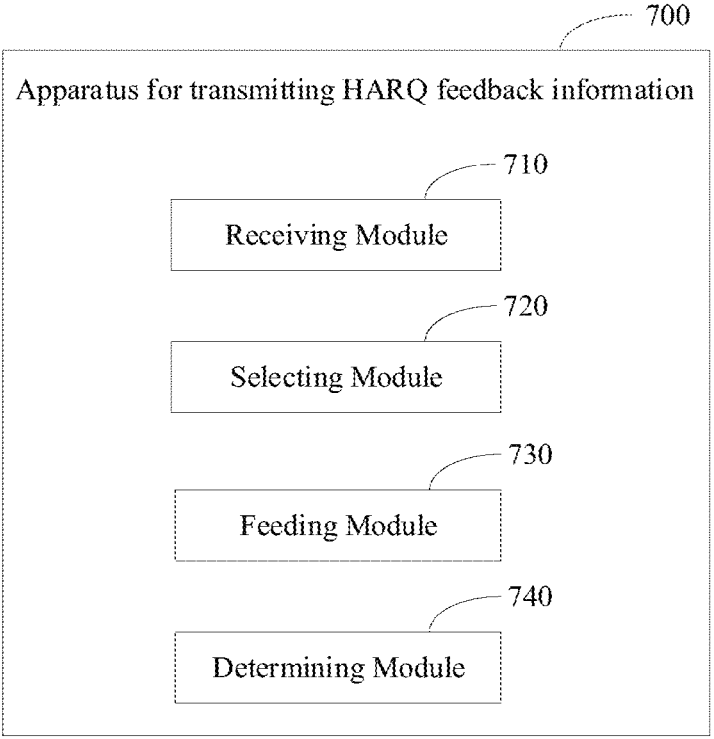

700

Apparatus for transmitting HARQ feedback information

Receiving Module — 710

Selecting Module — 720

Feeding Module — 730

Determining Module — 740

FIG. 7

METHOD, APPARATUS AND COMMUNICATION DEVICE FOR TRANSMITTING HARQ FEEDBACK INFORMATION

CROSS-REFERENCE TO RELATED APPLICATION

This application is the U.S. national phase application of International Application No. PCT/CN2020/142423, filed on Dec. 31, 2020, the disclosure of which is incorporated herein by reference in its entirety for all purposes.

TECHNICAL FIELD

The present disclosure relates to the field of wireless communication technologies, and in particular, relates to a method, apparatus, and communication device for transmitting hybrid automatic repeat request (HARQ) feedback information.

BACKGROUND

Today, ultra-reliable and low latency communication (URLLC) in Release 16 (Rel-16), compared with the URLLC in Release 15 (Rel-15), allows configuring a plurality of downlink semi-persistent scheduling (SPS) configurations for one serving cell. Moreover, a shorter period than the smallest SPS period in New Radio (NR) Rel-15, 10 ms, can be supported by the downlink SPS configurations in Rel-16 to reduce latency, i.e., shortened to one slot.

User equipment (UE) is expected to feed a corresponding hybrid automatic repeat request acknowledgement (HARQ-ACK) for every downlink (DL) physical downlink shared channel (PDSCH). Such an action is performed more frequently when the SPS PDSCH period in Rel-16 is shortened to one slot. However, available physical uplink control channel (PUCCH) resources are not enough for feeding the HARQ-ACKs in a time division duplex (TDD) system due to conflicting with DL symbols or unavailable reserved symbols, which causes a large number of HARQ-ACKs corresponding to SPS PDSCHs to be discarded.

SUMMARY

Examples of the present disclosure provide a method, apparatus, and communication device for transmitting HARQ feedback information.

The examples of a first aspect of the present disclosure provides a method of transmitting hybrid automatic repeat request (HARQ) feedback information, which includes: receiving a configuration indication message transmitted by a base station, where the configuration indication message indicates one or a plurality of uplink resources for the HARQ feedback information; selecting one or more target uplink resources from the one or the plurality of uplink resources according to the configuration indication message; and feeding the HARQ feedback information to the base station through the one or more target uplink resources.

The examples of a second aspect of the present disclosure provide another method of transmitting HARQ feedback information, which includes: transmitting a configuration indication message to user equipment (UE), where the configuration indication message indicates one or a plurality of uplink resources for the HARQ feedback information; and receiving the HARQ feedback information transmitted by the UE on one or more target uplink resources, where the one or more target uplink resources are selected from the one or the plurality of uplink resources.

The examples of a third aspect of the present disclosure provide user equipment (UE), which includes: a transceiver; a memory; and a processor, where the processor is coupled to the transceiver and the memory, respectively, and is configured to execute computer-executable instructions in the memory to control wireless signal transmission/reception of the transceiver, and to implement: receiving a configuration indication message transmitted by a base station, where the configuration indication message indicates one or a plurality of uplink resources for the HARQ feedback information; selecting one or more target uplink resources from the one or the plurality of uplink resources according to the configuration indication message; and feeding the HARQ feedback information to the base station through the one or more target uplink resources.

For additional aspects and advantages of the present disclosure, some of them will be set forth in the following description, and others will be apparent according to the following description or be learned through putting the present disclosure into practice.

BRIEF DESCRIPTION OF THE DRAWINGS

The above and/or additional aspects and advantages of the present disclosure will become apparent and readily understood according to the following description of the examples in conjunction with the accompanying drawings.

FIG. 1(a) is a first schematic diagram of configuring a K-set for UE through RRC.

FIG. 1(b) is a second schematic diagram of configuring a K-set for UE through RRC.

FIG. 2 is a schematic flowchart of a method of transmitting HARQ feedback information provided by an example of the present disclosure.

FIG. 6 is a schematic flowchart of another method of transmitting HARQ feedback information provided by an example of the present disclosure.

FIG. 7 is a schematic structure diagram of an apparatus for transmitting HARQ feedback information provided by an example of the present disclosure.

DETAILED DESCRIPTION OF THE EMBODIMENTS

Figure 3:
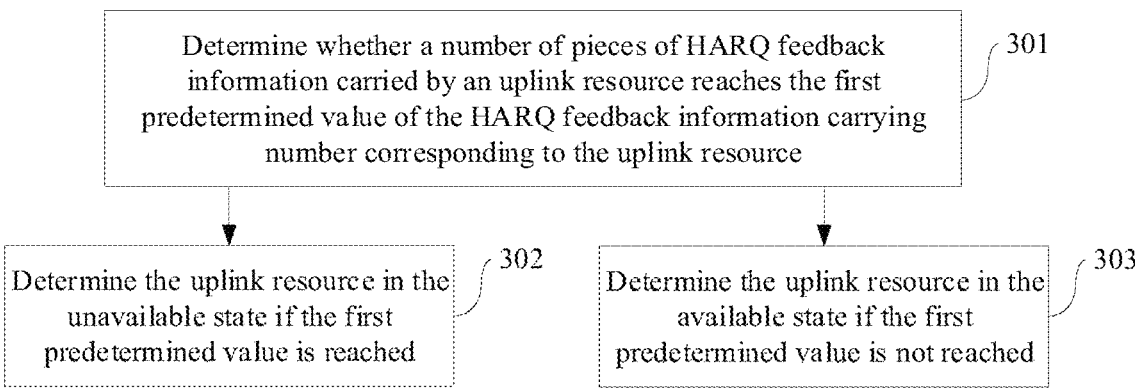
FIG. 3 is a schematic flowchart of another method of transmitting HARQ feedback information provided by an example of the present disclosure.

Embodiments will be described in detail here, with the examples thereof illustrated in the drawings. Where the following descriptions involve the drawings, like numerals in different drawings refer to like or similar elements unless otherwise indicated. The implementations described in the following examples do not represent all implementations consistent with the present disclosure. Rather, they are merely examples of apparatuses and methods consistent with some aspects of the present disclosure as detailed in the appended claims.

The terms used in the present disclosure are for the purpose of describing particular examples only, and are not intended to limit the present disclosure. Terms determined by "a" and "the" in their singular forms in the examples of the present disclosure and the appended claims are also intended to include their plural forms, unless clearly indicated otherwise in the context. It should also be understood that the term "and/or" as used in the description refers to and includes any and all possible combinations of one or more of the associated listed items.

It is to be understood that, although the terms "first", "second", "third", and the like may be adopted in the examples of the present disclosure to describe various information, these terms are only used to distinguish the information of the same type from each other, but the information should not be limited to these terms. For example, without departing from the scope of the present disclosure, first information may be referred to as second information; and similarly, second information may also be referred to as first information. Depending on the context, the word "if" as used herein may be interpreted as "when", "upon", or "in response to determining".

The following describes in detail the examples of the present disclosure. Illustrations of the examples are illustrated in the accompanying drawings, with the same or similar reference numerals referring to the same or similar elements throughout. The examples, which are described below with reference to the accompanying drawings, are illustrated and are intended to explain the present disclosure, but should not be construed as a limitation of the present disclosure.

In related arts, there are mainly two methods for solving a problem of discarding semi-persistent scheduling (SPS) hybrid automatic repeat request acknowledgements (HARQ-ACKs) in a time division duplex (TDD) system: postponing the HARQ-ACKs to a next available physical uplink control channel (PUCCH) for being fed; and dynamically triggering a one-time/type-3 codebook for HARQ-ACK repetition.

In related arts, by postponing the HARQ-ACKs to the next available PUCCH for being fed, it may cause unbalanced HARQ-ACK payloads on respective PUCCH resources. For example, all of them crowd on the first one of subsequent available resources, while other subsequent available resources are wasted since there are no HARQ-ACK bits to be transmitted. In addition, a base station is to configure a K-value corresponding to a semi-persistent scheduling (SPS) transmission in every SPS period time window, so as to construct a K-set. As illustrated in FIG. 1(a) and FIG. 1(b), user equipment (UE) is configured with a K-set, K={2, 3, 4, 5, 6, 7, 8}, through radio resource control (RRC), and UE checks and selects a K1-value in a K1-set for every SPS physical downlink shared channel (PDSCH).

However, the related arts have the disadvantages of high complexity and large configuration overhead. For instance, it is easy to cause out-of-order HARQ-ACK feedbacks when there is a relatively large configuration period.

The methods, apparatuses, and communication devices for transmitting hybrid automatic repeat request (HARQ) feedback information provided by the present disclosure will be described in detail below with reference to the accompanying drawings.

FIG. 2 is a schematic flowchart of a method of transmitting HARQ feedback information provided by an example of the present disclosure, which is applicable to a UE (for example, a mobile terminal such as a mobile phone and a tablet computer).

As illustrated in FIG. 2, the method of transmitting HARQ feedback information may include the following steps.

At step 101, a configuration indication message transmitted by a base station is received, where the configuration indication message indicates one or a plurality of uplink resources for the HARQ feedback information. For example, the configuration indication message described in this example may be a configuration indication message within a preset configuration period. The preset configuration period may be calibrated according to actual conditions. For example, the preset configuration period may be an SPS period, that is, within a SPS period window. Moreover, the configuration indication message may be a set.

In this example of the present disclosure, the configuration indication message may be generated by the base station. The configuration indication message may include a number of pieces of downlink data for which HARQs are to be fed and a number of uplink resources suitable for feeding the HARQs. The one or the plurality of uplink resources may be PUCCH resources, and there may be the plurality of uplink resources suitable for feeding the HARQs.

For example, the base station described in this example may cover a plurality of cells that provide services for the UE. Depending on a specific application scenario, the base station may be called an access point, a device that communicates with wireless UE (e.g., a mobile terminal) over an air interface through one or more sectors in an access network, or another name. The base station may be a network device.

In particular, the base station may generate the configuration indication message in accordance with a preset generation algorithm and transmit the configuration indication message to the UE. The UE receives the configuration indication message transmitted by the base station. The preset generation algorithm may be calibrated according to actual conditions. The calibration of the preset generation algorithm may take a load balance of uplink resources (i.e., PUCCH resources) into consideration.

For example, the base station described in this example may transmit the configuration indication message through RRC signaling or through medium access control-control element (MAC-CE) signaling.

At step 102, one or more target uplink resources are selected from the one or the plurality of uplink resources according to the configuration indication message.

In this example of the present disclosure, the UE in a power-on state may periodically send out messages (that is, transmit some data). Since the UE and the base station are in the same frequency band, the base station can receive the signals (i.e., packets) transmitted by the UE to form a handshake; that is, a link is established between the UE and the base station. When there are a plurality of base stations in the environment where the UE is located, the UE usually selects the base station with the strongest signal to establish a connection by default. In other words, the UE in the power-on state may maintain a real-time connection with the base station and may obtain downlink data from the base station in real time through the above-mentioned link.

At step 103, the HARQ feedback information is fed to the base station through the one or more target uplink resources.

In particular, after receiving the configuration indication message transmitted by the base station, the UE may receive and demodulate the downlink data obtained from the base station through the above-mentioned link to obtain a reception and demodulation result of the downlink data, and obtain the HARQ feedback information to be fed based on the reception and demodulation result. Then, the UE may parse the configuration indication message to acquire the number of pieces of downlink data for which HARQs are to be fed and the number of uplink resources suitable for feeding the HARQs. And then, the UE may select the one or more target uplink resources in turn from the plurality of uplink resources for the feedback information to be fed based on the number of pieces of downlink data for which HARQs are to be fed and the number of uplink resources suitable for feeding the HARQs. And finally, the UE may feed the HARQ feedback information to the base station through the one or more target uplink resources. One piece of downlink data may correspond to one piece of HARQ feedback information.

In this example of the present disclosure, the UE receives the configuration indication message transmitted by the base station, selects the one or more target uplink resources from the one or the plurality of uplink resources according to the configuration indication message, and feeds the HARQ feedback information to the base station through the one or more target uplink resources. Therefore, it avoids a problem of out-of-order HARQ feedbacks due to unreasonable K-value setting, and facilitates a flexible target uplink resource selection, thereby improving an accuracy of transmitting the HARQ feedback information.

In order to clearly illustrate the previous example, in one example of the present disclosure, the method of transmitting HARQ feedback information may further include determining states of the plurality of uplink resources according to the configuration indication message.

For example, a number of pieces of HARQ feedback information that can be carried by each of the plurality of uplink resources described in this example is limited. For example, the number of pieces of HARQ feedback information that can be carried by each uplink resource may be 2, 3, 4, etc., which may be calibrated according to the actual conditions. In addition, the number of pieces of HARQ feedback information that can be carried by each uplink resource may vary. For example, the number of pieces of HARQ feedback information that can be carried by one of the plurality of uplink resources is 2, while the number of pieces of HARQ feedback information that can be carried by another of the plurality of uplink resources is 3, which is not limited here.

In particular, after acquiring the number of pieces of downlink data for which HARQs are to be fed and the number of uplink resources suitable for feeding the HARQs from the configuration indication message, the UE may analyze each uplink resource suitable for feeding the HARQs to determine the number of pieces of HARQ feedback information that can be carried by each uplink resource suitable for feeding the HARQs, and determine the states of the plurality of uplink resources based on these numbers.

An uplink resource may be determined in an available state when the number of pieces of HARQ feedback information that can be carried by it is not zero, and may be determined in an unavailable state when the number is zero.

Further, in one example of the present disclosure, a current uplink resource may be taken as the target uplink resource when the current uplink resource is in the available state, and a next uplink resource may be taken as the target uplink resource when the current uplink resource is in the unavailable state but the next uplink resource is in the available state.

In particular, after determining the states of the plurality of uplink resources according to the configuration indication message, the UE may determine the state of the current uplink resource. If the current uplink resource is in the available state, the UE may take the current uplink resource as the target uplink resource, and feed the HARQ feedback information to be fed on the target uplink resource. When a feedback amount reaches the number of pieces of HARQ feedback information that can be carried by the target uplink resource, the target uplink resource may be changed into the unavailable state, and the UE may sequentially search backwards and take the next uplink resource in the available state as the target uplink resource. If the current uplink resource is in the unavailable state, the UE sequentially searches backwards and takes the next uplink resource in the available state as the target uplink resource. The above operations are repeated until the feedbacks for all of the downlink data for which HARQs are to be fed are completed.

The following describes in detail how to set the states of the plurality of uplink resources according to the configuration indication message.

As illustrated in FIG. 3, in one example of the present disclosure, the configuration indication message may further include a first predetermined value indicating an HARQ feedback information carrying number corresponding to each uplink resource. That is, the number of pieces of HARQ feedback information that should be carried by each uplink resource is indicated directly by the base station to the UE. In particular, the states of the plurality of uplink resources are determined according to the configuration indication message, which may include the following steps.

At step 301, it is determined whether a number of pieces of HARQ feedback information carried by an uplink resource reaches the first predetermined value of the HARQ feedback information carrying number corresponding to the uplink resource.

In this example of the present disclosure, after receiving the configuration indication message transmitted by the base station, the UE may parse the configuration indication message, so that the first predetermined value indicating the HARQ feedback information carrying number corresponding to each uplink resource is also obtained at the same time as the number of pieces of downlink data for which HARQs are to be fed and the number of uplink resources suitable for feeding the HARQs are acquired. In addition, the number of pieces of HARQ feedback information that should be carried by each uplink resource may be configured for the uplink resource according to the first predetermined value of the HARQ feedback information carrying number corresponding to each uplink resource.

At step 302, the uplink resource is determined in the unavailable state if the first predetermined value is reached.

At Step 303, the uplink resource is determined in the available state if the first predetermined value is not reached.

In particular, during such a process in which the UE is feeding the HARQ feedback information on a corresponding uplink resource, the UE may acquire in real time the number of pieces of HARQ feedback information carried by the current uplink resource on which the feeding is ongoing, and determine whether the number of pieces of HARQ feedback information carried by the uplink resource reaches the first predetermined value corresponding to the uplink resource. The UE determines that the uplink resource is in the unavailable state and searches for the next available uplink resource in turn if the first predetermined value is reached, and determines that the uplink resource is in the available state if the first predetermined value is not reached.

As an example, supposing that within one SPS period window, the number of pieces of downlink data for which HARQs are to be fed is 7, the number of uplink resources suitable for feeding the HARQs may be 3, and the number of pieces of HARQ feedback information that should be carried by each uplink resource (i.e., the first predetermined value) indicated directly by the base station is: numberof-HARQ={2,2,3}. The first uplink resource is changed into the unavailable state when it is determined that the number of pieces of HARQ feedback information carried by the first uplink resource is 2, the second uplink resource is adopted for feeding the HARQ feedback information, and so on, until all of the feedbacks within the SPS period window are completed.

Figure 4:
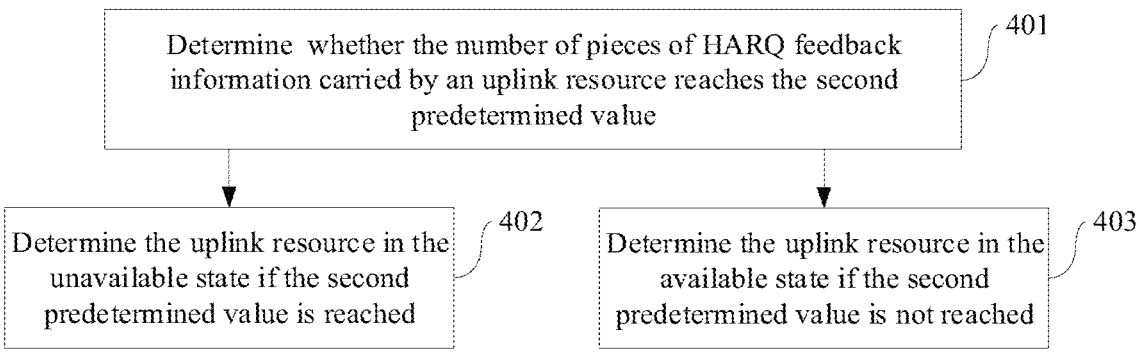
FIG. 4 is a schematic flowchart of another method of transmitting HARQ feedback information provided by an example of the present disclosure.

As illustrated in FIG. 4, in another example of the present disclosure, there may be N uplink resources within a preset configuration period, and the configuration indication message may include a second predetermined value indicating an HARQ feedback information carrying mean corresponding to 1st to (N−1)th uplink resources, where N is a positive integer. In other words, the base station calculates the second predetermined value indicating the HARQ feedback information carrying mean corresponding to the 1st to (N−1)th uplink resources except for the last uplink resource. The second predetermined value may be equal to a positive integer of M/N when there are M pieces of the HARQ feedback information, where M may be a positive integer. In particular, the states of the plurality of uplink resources are determined according to the configuration indication message, which may include the following steps.

At step 401, it is determined whether the number of pieces of HARQ feedback information carried by an uplink resource reaches the second predetermined value.

In this example of the present disclosure, after receiving the configuration indication message transmitted by the base station, the UE may parse the configuration indication message, so that the second predetermined value indicating the HARQ feedback information carrying mean corresponding to the 1st to (N−1)th uplink resources is also obtained at the same time as the number of pieces of downlink data for which HARQs are to be fed and the number of uplink resources suitable for feeding the HARQs are acquired. In addition, the number of pieces of HARQ feedback information that should be carried by (N−1) uplink resources may be configured for these uplink resources according to the second predetermined value of the HARQ feedback information carrying mean corresponding to the 1st to (N−1)th uplink resources.

At step 402, the uplink resource is determined in the unavailable state if the second predetermined value is reached.

At step 403, the uplink resource is determined in the available state if the second predetermined value is not reached.

In particular, during such a process in which the UE is feeding the HARQ feedback information on a corresponding uplink resource, the UE may acquire the number of pieces of HARQ feedback information carried by the current uplink resource on which the feeding is ongoing among the 1st to (N−1)th uplink resources, and determine whether the number of pieces of HARQ feedback information carried by the uplink resource reaches the second predetermined value. The UE determines that the uplink resource is in the unavailable state and searches for the next available uplink resource in turn if the second predetermined value is reached, and determines that the uplink resource is in the available state if the second predetermined value is not reached.

Further, in one example of the present disclosure, the N-th uplink resource may be determined as the target uplink resource.

In particular, if the HARQ feedback information within the preset period window is not fed completely through the 1st to (N−1)th uplink resources, it may search for the next available uplink resource (i.e., the N-th uplink resource) in turn for continuing to feed the HARQ feedback information. At this time, the UE may determine that the available uplink resource is the N-th uplink resource, that is, determine the N-th uplink resource as the target uplink resource.

As an example, supposing that within one SPS period window, the number of pieces of downlink data for which HARQs are to be fed is 7, the number of uplink resources suitable for feeding the HARQs may be 3, and the second predetermined value corresponding to a first uplink resource and a second uplink resource indicated directly by the base station is: meanofHARQ=ceiling [7/3]=3. In particular, when the first uplink resource is determined as the current uplink resource on which the feeding is ongoing, it is determined whether the number of pieces of HARQ feedback information carried by the first uplink resource is 3. The first uplink resource is changed into the unavailable state, and the second uplink resource is adopted for feeding the HARQ feedback information if the answer is yes. In the case where the second uplink resource has carried 3 pieces of HARQ feedback information, but one piece of HARQ feedback information of the downlink data for which HARQs are to be fed is still not fed, it may take the remaining third uplink resource as the target uplink resource for feeding the HARQ feedback information, for which no carrying amount is limited.

Figure 5:
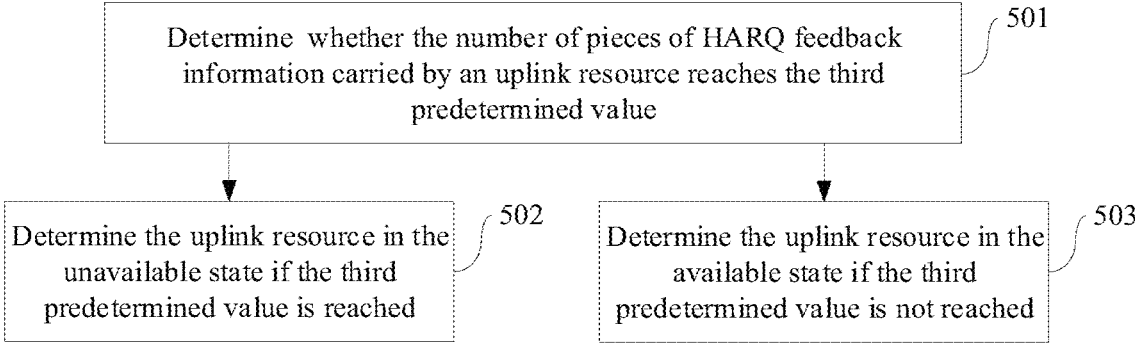
FIG. 5 is a schematic flowchart of another method of transmitting HARQ feedback information provided by an example of the present disclosure.

As illustrated in FIG. 5, in another example of the present disclosure, the configuration indication message may include a third predetermined value indicating an HARQ feedback information carrying maximum corresponding to each uplink resource within the preset configuration period. That is, the number of pieces of HARQ feedback information that should be carried by each uplink resource is indicated directly by the base station to the UE. In particular, the states of the plurality of uplink resources are determined according to the configuration indication message, which may include the following steps.

At step 501, it is determined whether the number of pieces of HARQ feedback information carried by an uplink resource reaches the third predetermined value.

In this example of the present disclosure, after receiving the configuration indication message transmitted by the base station, the UE may parse the configuration indication message, so that the third predetermined value indicating the HARQ feedback information carrying maximum corresponding to each uplink resource within the preset configuration period is also obtained at the same time as the number of pieces of downlink data for which HARQs are to be fed and the number of uplink resources suitable for feeding the HARQs are acquired. In addition, the number of pieces of HARQ feedback information that should be carried by each uplink resource may be configured for the uplink resource according to the third predetermined value of the HARQ feedback information carrying maximum corresponding to each uplink resource.

At step 502, the uplink resource is determined in the unavailable state if the third predetermined value is reached.

At step 503, the uplink resource is determined in the available state if the third predetermined value is not reached.

In particular, during such a process in which the UE is feeding the HARQ feedback information on a corresponding uplink resource, the UE may acquire in real time the number of pieces of HARQ feedback information carried by the current uplink resource on which the feeding is ongoing, and determine whether the number of pieces of HARQ feedback information carried by the uplink resource reaches the third predetermined value. The UE determines that the uplink resource is in the unavailable state and searches for the next available uplink resource in turn if the third predetermined value is reached, and determines that the uplink resource is in the available state (or is kept in the available state) if the third predetermined value is not reached.

As an example, supposing that within one SPS period window, the number of pieces of downlink data for which HARQs are to be fed is 7, the number of uplink resources suitable for feeding the HARQs may be 3, and the maximum number of pieces of HARQ feedback information that should be carried by each uplink resource (i.e., the third predetermined value) indicated directly by the base station is: maxnumofHARQ=4. The first uplink resource is changed into the unavailable state when it is determined that the number of pieces of HARQ feedback information carried by the first uplink resource is 4, the second uplink resource is adopted for feeding the HARQ feedback information, and so on, until all of the feedbacks within the SPS period window are completed.

For example, the methods in which the states of the plurality of uplink resources are set according to the configuration indication messages in the above three examples facilitate a PUCCH load balance and a flexible PUCCH resource selection, while avoid the problem of out-of-order HARQ feedbacks due to unreasonable K-value setting, and greatly reduce overhead since only once indication is required within the time window of one SPS period.

According to the methods of transmitting HARQ feedback information in the examples of the present disclosure, the configuration indication message transmitted by the base station is received first, and one or more target uplink resources are selected from the one or the plurality of uplink resources according to the configuration indication message, and then the HARQ feedback information is fed to the base station through the one or more target uplink resources. Therefore, it avoids a problem of out-of-order HARQ feedbacks due to unreasonable K-value setting, and facilitates a flexible target uplink resource selection, thereby improving an accuracy of transmitting the HARQ feedback information.

FIG. 6 is a schematic flowchart of another method of transmitting HARQ feedback information provided by an example of the present disclosure, which is applicable to a base station.

For example, the base station described in this example may cover a plurality of cells that provide services for a UE. Depending on a specific application scenario, the base station may be called an access point, a device that communicates with wireless UE (e.g., a mobile terminal) over an air interface through one or more sectors in an access network, or another name. The base station may be a network device.

As illustrated in FIG. 6, the method of transmitting HARQ feedback information may include the following steps.

At step 601, a configuration indication message is transmitted to the UE, where the configuration indication message indicates one or a plurality of uplink resources for the HARQ feedback information. For example, the configuration indication message described in this example may be a configuration indication message within a preset configuration period. The preset configuration period may be calibrated according to actual conditions. For example, the preset configuration period may be an SPS period, that is, within a SPS period window.

At step 602, the HARQ feedback information transmitted by the UE is received on one or more target uplink resources. The one or more target uplink resources are selected from the one or the plurality of uplink resources.

In particular, the base station may generate the configuration indication message in accordance with a preset generation algorithm and transmit the configuration indication message to the UE. The preset generation algorithm may be calibrated according to the actual conditions. The calibration of the preset generation algorithm may take a load balance of uplink resources (i.e., PUCCH resources) into consideration.

In some examples, the configuration indication message is transmitted through RRC signaling or through MAC-CE signaling.

In some examples, generating the configuration indication message includes: acquiring a number of pieces of downlink data for which HARQs are to be fed; acquiring a number of uplink resources suitable for feeding the HARQs; and generating the indication message based on the number of pieces of downlink data and the number of uplink resources.

In some examples, the configuration indication message is further used for a first predetermined value indicating an HARQ feedback information carrying number corresponding to each uplink resource, a second predetermined value indicating an HARQ feedback information carrying mean corresponding to each uplink resource, or a third predetermined value indicating an HARQ feedback information carrying maximum corresponding to each uplink resource within a preset configuration period.

In some examples, the one or the plurality of uplink resources are PUCCH resources.

The foregoing explanations to the examples of the method of transmitting HARQ feedback information provided by FIG. 2 to FIG. 5 are also appropriate to the method of transmitting HARQ feedback information in these examples, which are not repeated here.

According to these examples of the method of transmitting HARQ feedback information in the present disclosure, the configuration indication message is transmitted to the UE and the HARQ feedback information transmitted by the UE is received on the one or more target uplink resources, which avoids a problem of out-of-order HARQ feedbacks due to unreasonable K-value setting and facilitates a flexible target uplink resource selection, thereby improving an accuracy of transmitting the HARQ feedback information.

FIG. 7 is a schematic structure diagram of an apparatus for transmitting HARQ feedback information provided by an example of the present disclosure. The apparatus may be applied to a UE (e.g., a mobile terminal such as a mobile phone and a tablet computer).

As illustrated in FIG. 7, the apparatus 700 for transmitting HARQ feedback information may include: a receiving module 710, a selecting module 720, and a feeding module 730.

The receiving module 710 is configured to receive a configuration indication message transmitted by a base station. The configuration indication message indicates one or a plurality of uplink resources for the HARQ feedback information.

The selecting module 720 is configured to select one or more target uplink resources from the one or the plurality of uplink resources according to the configuration indication message.

The feeding module 730 is configured to feed the HARQ feedback information to the base station through the one or more target uplink resources.

In some examples, the above apparatus 700 for transmitting HARQ feedback information further includes a determining module 740. The determining module 740 is configured to determine states of the plurality of uplink resources according to the configuration indication message.

In some examples, the selecting module 720 is configured to: take a current uplink resource as the target uplink resource in response to the current uplink resource in an available state.

In some examples, the selecting module 720 is configured to: take an uplink resource next to a current uplink resource as the target uplink resource in response to the current uplink resource being in an unavailable state, but the uplink resource next to the current uplink resource being in an available state.

In some examples, the configuration indication message includes a first predetermined value indicating an HARQ feedback information carrying number corresponding to each uplink resource. The determining module 740 is configured to: determine whether a number of pieces of HARQ feedback information carried by the uplink resource reaches the first predetermined value of the HARQ feedback information carrying number corresponding to the uplink resource; determine that the uplink resource is in an unavailable state in response to reaching the first predetermined value; and determine that the uplink resource is in an available state in response to determining that the first predetermined value is not reached.

In some examples, there are N uplink resources within a preset configuration period, and the configuration indication message includes a second predetermined value indicating an HARQ feedback information carrying mean corresponding to 1st to (N−1)th uplink resources, where N is a positive integer. The determining module 740 is configured to: determine whether a number of pieces of HARQ feedback information carried by the uplink resource reaches the second predetermined value; determine that the uplink resource is in an unavailable state in response to reaching the second predetermined value; and determine that the uplink resource is in an available state in response to determining that the second predetermined value is not reached.

In some examples, the second predetermined value is equal to a positive integer of M/N when there are M pieces of the HARQ feedback information, where M is a positive integer.

In some examples, the determining module 740 is further configured to: determine an N-th uplink resource as the target uplink resource.

In some examples, the configuration indication message includes a third predetermined value indicating an HARQ feedback information carrying maximum corresponding to each uplink resource within a preset configuration period. The determining module 740 is configured to: determine whether a number of pieces of HARQ feedback information carried by the uplink resource reaches the third predetermined value; determine that the uplink resource is in an unavailable state in response to reaching the third predetermined mined value; and determine that the uplink resource is in an available state in response to determining that the third predetermined value is not reached.

In some examples, the receiving module 710 receives the configuration indication message that is transmitted by the base station through RRC signaling or through MAC-CE signaling.

In some examples, the one or the plurality of uplink resources are PUCCH resources.

The foregoing explanations of the examples of the method of transmitting HARQ feedback information provided by FIG. 2 to FIG. 5 are also appropriate to the apparatuses for transmitting HARQ feedback information in the examples, which are not repeated here.

According to the apparatuses for transmitting HARQ feedback information in the examples of the present disclosure, the receiving module receives the configuration indication message from the base station, the selecting module obtains the HARQ feedback information to be fed based on a reception and demodulation result of downlink data of the base station and selects the one or more target uplink resources for the HARQ feedback information to be fed from the plurality of uplink resources in turn according to the configuration indication message, and the feeding module feeds the HARQ feedback information corresponding to the downlink data to the base station through the one or more target uplink resources. Therefore, it avoids a problem of out-of-order HARQ feedbacks due to unreasonable K-value setting and facilitates a flexible target uplink resource selection, thereby improving an accuracy of transmitting HARQ feedback information.

Figure 8:
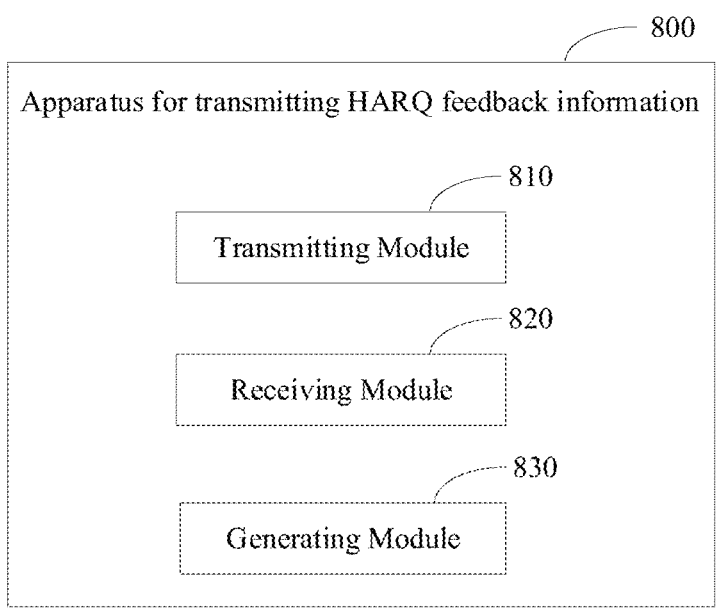
FIG. 8 is a schematic structure diagram of another apparatus for transmitting HARQ feedback information provided by an example of the present disclosure.

FIG. 8 is a schematic structure diagram of another apparatus for transmitting HARQ feedback information provided by an example of the present disclosure. The apparatus may be applied to a base station.

As illustrated in FIG. 8, the apparatus 800 for transmitting HARQ feedback information may include: a transmitting module 810 and a receiving module 820.

The transmitting module 810 is configured to transmit a configuration indication message to a UE. The configuration indication message indicates one or a plurality of uplink resources for the HARQ feedback information.

The receiving module 820 is configured to receive the HARQ feedback information transmitted by the UE on one or more target uplink resources. The one or more target uplink resources are selected from the one or the plurality of uplink resources.

In some examples, the transmitting module 810 transmits the configuration indication message through RRC signaling or through MAC-CE signaling.

In some examples, as illustrated in FIG. 8, the apparatus 800 for transmitting HARQ feedback information may further include a generating module 830. The generating module 830 is configured to: acquire a number of pieces of downlink data for which HARQs are to be fed; acquire a number of uplink resources suitable for feeding the HARQs; and generate the indication message based on the number of pieces of downlink data and the number of uplink resources.

In some examples, the configuration indication message is further used for a first predetermined value indicating an HARQ feedback information carrying number corresponding to each uplink resource, a second predetermined value indicating an HARQ feedback information carrying mean corresponding to each uplink resource, or a third predetermined value indicating an HARQ feedback information carrying maximum corresponding to each uplink resource within a preset configuration period.

In some examples, the one or the plurality of uplink resources are PUCCH resources.

The foregoing explanations of the examples of the method of transmitting HARQ feedback information provided by FIG. 2 to FIG. 5 are also appropriate to the apparatuses for transmitting HARQ feedback information in the examples, which are not repeated here.

According to the apparatuses for transmitting HARQ feedback information in the examples of the present disclosure, the transmitting module transmits the configuration indication message to the UE and the receiving module receives the HARQ feedback information transmitted by the UE on the one or more target uplink resources, which avoids a problem of out-of-order HARQ feedbacks due to unreasonable K-value setting and facilitates a flexible target uplink resource selection, thereby improving an accuracy of transmitting the HARQ feedback information.

In order to realize the above examples, the present disclosure also provides a communication device.

The communication device provided by an example of the present disclosure includes a processor, a transceiver, a memory, and an executable program that is stored in the memory and is capable of being executed by the processor. The processor performs the foregoing methods when executing the executable program.

The communication device may be the aforementioned network device or terminal device.

The memory may include a storage medium of various types. The storage medium is a non-transitory computer storage medium that is capable of keeping information stored thereon after the communication device is powered off. The communication device includes a terminal.

The processor may be coupled to the memory through a bus or the like, and is used to read an executable program stored in the memory, for example, as illustrated in at least one of FIG. 2 to FIG. 5.

In order to implement the above examples, the present disclosure also provides another communication device.

The communication device provided by an example of the present disclosure includes a processor, a transceiver, a memory, and an executable program that is stored in the memory and is capable of being executed by the processor. The processor performs the foregoing methods when executing the executable program.

The communication device may be the aforementioned network device or terminal device.

The memory may include a storage medium of various types. The storage medium is a non-transitory computer storage medium that is capable of keeping information thereon stored after the communication device is powered off. The communication device includes a base station.

The processor may be coupled to the memory through a bus or the like, and is used to read an executable program stored in the memory, for example, as illustrated in FIG. 6.

In order to implement the above examples, the present disclosure also provides a computer storage medium.

The computer storage medium provided by an example of the present disclosure stores an executable program. After being executed by a processor, the executable program can implement the foregoing methods, for example, as illustrated in at least one of FIG. 2 to FIG. 5.

In order to implement the above examples, the present disclosure also provides another computer storage medium.

The computer storage medium provided by an example of the present disclosure stores an executable program. After being executed by a processor, the executable program can implement the foregoing methods, for example, as illustrated in FIG. 6.

Figure 9:
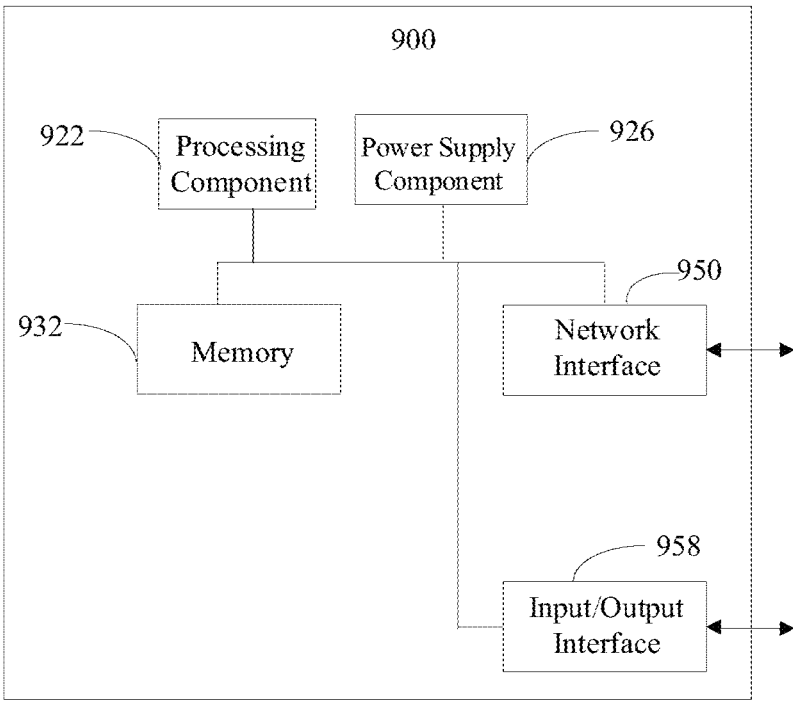
FIG. 9 is a schematic structure diagram of a base station provided by an example of the present disclosure.

As illustrated in FIG. 9, it is a schematic structure diagram of a base station provided by an example of the present disclosure. The base station may be provided as a network device. By referring to FIG. 9, the base station 900 includes a processing component 922 which further includes at least one processor, and memory resources represented by a memory 932 and used to store instructions that may be executed by the processing component 922, e.g., application programs. The application programs stored in the memory 932 may include one or more modules, each of which corresponds to a set of instructions. In addition, the processing component 922 is configured to execute instructions to perform any one of the aforementioned methods applicable to the base station, for example, the method illustrated in FIG. 6.

The base station 900 may also include a power supply component 926 configured to perform power management for the base station 900, a wired or wireless network interface 950 configured to connect the base station 900 to a network, and an input/output (I/O) interface 958. The base station 900 may operate based on an operating system stored in the memory 932, such as Windows Server™, Mac OS X™, Unix™, Linux™, FreeBSD™, or the like.

Figure 10:
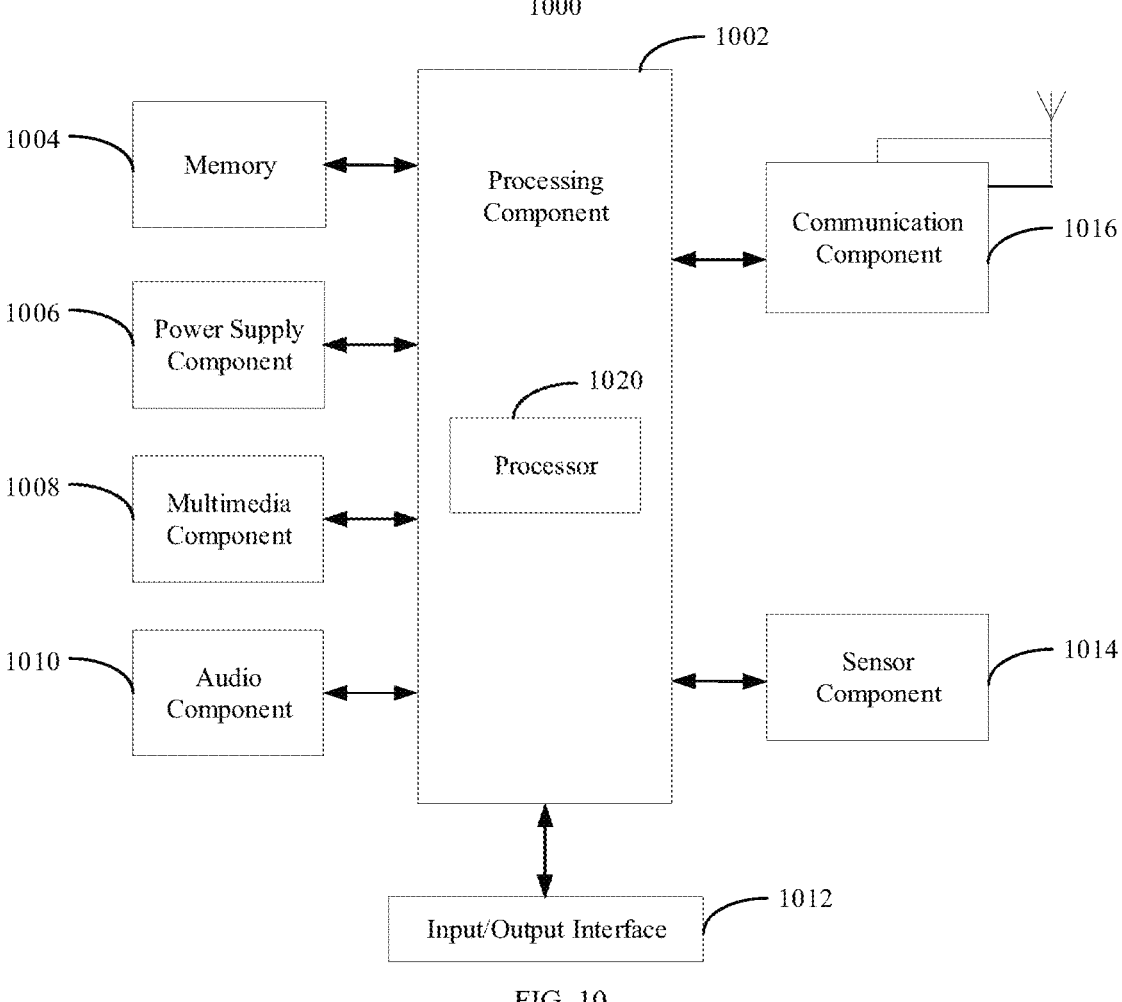
FIG. 10 is a block diagram of a UE provided by an example of the present disclosure.

FIG. 10 is a block diagram of a UE provided by an example of the present disclosure. For example, the UE 1000 may be a mobile phone, a computer, a digital broadcasting user device, a messaging device, a game console, a tablet device, a medical device, a fitness device, a personal digital assistant, and the like.

By referring to FIG. 10, the UE 1000 may include one or more of the following components: a processing component 1002, a memory 1004, a power supply component 1006, a multimedia component 1008, an audio component 1010, an input/output (I/O) interface 1012, a sensor component 1014, and a communication component 1016.

The processing component 1002 generally controls the overall operations of the UE 1000, such as operations associated with display, phone calls, data communications, camera operations, and recording operations. The processing component 1002 may include at least one processor 1020 to execute instructions to complete all or a part of the steps of the above methods. In addition, the processing component 1002 may include at least one module that facilitates the interaction between the processing component 1002 and other components. For example, the processing component 2002 may include a multimedia module to facilitate the interaction between the multimedia component 1008 and the processing component 1002.

The memory 1004 is configured to store various types of data to support the operations of the UE 1000. Examples of such data include instructions for any application or method operated on the UE 1000, contact data, phonebook data, messages, pictures, videos, and the like. The memory 1004 may be implemented by any type of volatile or non-volatile storage device or a combination thereof, such as a static random access memory (SRAM), an electrically erasable programmable read-only memory (EEPROM), an erasable and programmable read-only memory (EPROM), a programmable read-only memory (PROM), a read-only memory (ROM), a magnetic memory, a flash memory, a magnetic disk or an optical disk.

The power supply component 1006 provides power for various components of the UE 1000. The power supply component 1006 may include a power management system, at least one power supply, and other components associated with generating, managing, and distributing power for the UE 1000.

The multimedia component 1008 includes a screen providing an output interface between the UE 1000 and a user. In some examples, the screen may include a liquid crystal display (LCD) and a touch panel (TP). If the screen includes the TP, the screen may be implemented as a touch screen to receive input signals from the user. The TP may include at least one touch sensor to sense touches, swipes, and gestures on the TP. The touch sensors may not only sense a boundary of a touch or swipe, but also sense a lasting time and a pressure associated with the touch or swipe. In some examples, the multimedia component 1008 includes a front camera and/or a rear camera. The front camera and/or rear camera may receive external multimedia data when the UE 1000 is in an operating mode, such as a photographing mode or a video mode. Each front camera and rear camera may be a fixed optical lens system or have a focal length and optical zooming capability.

The audio component 1010 is configured to output and/or input an audio signal. For example, the audio component 1010 includes a microphone (MIC) that is configured to receive an external audio signal when the UE 1000 is in an operating mode, such as a call mode, a recording mode, and a voice recognition mode. The received audio signal may be further stored in memory 1004 or transmitted via communication component 1016. In some examples, the audio component 1010 also includes a speaker for outputting an audio signal.

The I/O interface 1012 provides an interface between the processing component 1002 and a peripheral interface module. The above peripheral interface module may be a keyboard, a click wheel, buttons, or the like. These buttons may include, but are not limited to, a home button, a volume button, a start button, and a lock button.

The sensor component 1014 includes at least one sensor to provide the UE 1000 with status assessments in various aspects. For example, the sensor component 1014 may detect an open/closed state of the UE 1000 and a relative positioning of components such as the display and keypad of the UE 1000, and the sensor component 1014 may also detect a change in position of the UE 1000 or a component of the UE 1000, the presence or absence of user contact with the UE 1000, orientation or acceleration/deceleration of the UE 1000, and temperature change of the UE 1000. The sensor component 1014 may include a proximity sensor configured to detect the presence of a nearby object without any physical contact. The sensor component 1014 may further include an optical sensor, such as a complementary metal-oxide-semiconductor (CMOS) or charged-coupled device (CCD) image sensor, which is used in imaging applications. In some examples, the sensor component 1014 may also include an acceleration sensor, a gyro sensor, a magnetic sensor, a pressure sensor, or a temperature sensor.

The communication component 1016 is configured to facilitate wired or wireless communication between the UE 1000 and other devices. The UE 1000 may access a wireless network based on a communication standard, such as WiFi, 2G or 3G, 4G LTE, 5G NR, or a combination thereof. In one example, the communication component 1016 receives broadcast signals or broadcast-related information from an external broadcast management system via a broadcast channel. In one example, the communication component 1016 also includes a near field communication (NFC) module to facilitate short-range communication. For example, the NFC module may be implemented based on a radio frequency identification (RFID) technology, an infrared data association (IrDA) technology, an ultra-wideband (UWB) technology, a Bluetooth® (BT) technology, and other technologies.

In one or more examples, the UE 1000 may be implemented by at least one application specific integrated circuit (ASIC), digital signal processor (DSP), digital signal processing device (DSPD), programmable logic device (PLD), field programmable gate array (FPGA), controller, microcontroller, microprocessor, or another electronic component for performing the above methods illustrated in FIG. 1 to FIG. 5.

In one or more examples, there is also provided a non-transitory computer-readable storage medium including instructions, such as the memory 1004, including instructions. These instructions may be executed by the processor 1020 of the UE 1000 to complete the above methods. For example, the non-transitory computer-readable storage medium may be a read-only memory (ROM), a random access memory (RAM), a CD-ROM, a magnetic tape, a floppy disk, an optical data storage device, and the like.

According to the methods, apparatuses and communication devices for transmitting HARQ feedback information provided by the examples of the present disclosure, UE receives a configuration indication message from a base station, obtains HARQ feedback information to be fed based on a reception and demodulation result of downlink data of the base station, selects one or more target uplink resources for the HARQ feedback information to be fed from a plurality of uplink resources in turn according to the configuration indication message, and then feeds the HARQ feedback information corresponding to the downlink data to the base station through the one or more target uplink resources. Therefore, it avoids a problem of out-of-order HARQ feedbacks due to unreasonable K-value setting, and facilitates a flexible target uplink resource selection, thereby improving an accuracy of transmitting the HARQ feedback information.

Other implementations of the present disclosure will be readily apparent to those skilled in the art after implementing the disclosure by referring to the specification. The present disclosure is intended to cover any variations, uses, or adaptations of the present disclosure that are in accordance with the general principles thereof and include common general knowledge or conventional technical means in the art that are not disclosed in the present disclosure. The description and the examples are only illustrative, and the scope and spirit of the present disclosure are to be indicated by appended claims.

It should be understood that the present disclosure is not limited to the above-described accurate structures illustrated in the drawings, and various modifications and changes can be made to the present disclosure without departing from the scope thereof. The scope of the present disclosure is to be limited only by the appended claims.

The invention claimed is:

1. A method of transmitting hybrid automatic repeat request (HARQ) feedback information, comprising:
   receiving, by user equipment (UE), a configuration indication message transmitted by a base station, wherein the configuration indication message indicates a plurality of uplink resources for the HARQ feedback information;
   selecting, by the UE, one or more target uplink resources from the plurality of uplink resources according to the configuration indication message; and feeding, by the UE, the HARQ feedback information to the base station through the one or more target uplink resources;

wherein there are N uplink resources within a preset configuration period, and the configuration indication message comprises a second predetermined value indicating an HARQ feedback information carrying mean corresponding to 1st to (N–1)th uplink resources, wherein the N is a positive integer, and wherein the method further comprises:

determining whether a number of pieces of HARQ feedback information carried by the uplink resource reaches the second predetermined value, determining that the uplink resource is in an unavailable state in response to reaching the second predetermined value, and determining that the uplink resource is in an available state in response to determining that the second predetermined value is not reached;

or wherein the configuration indication message comprises a third predetermined value indicating an HARQ feedback information carrying maximum corresponding to each uplink resource within the preset configuration period, and wherein the method further comprises:

determining whether a number of pieces of HARQ feedback information carried by the uplink resource reaches the third predetermined value, determining that the uplink resource is in the unavailable state in response to reaching the third predetermined value, and determining that the uplink resource is in the available state in response to determining that the third predetermined value is not reached.

2. The method according to claim 1, wherein a current uplink resource is taken as the one or more target uplink resources in response to the current uplink resource in an available state.

3. The method according to claim 1, wherein an uplink resource next to a current uplink resource is taken as the one or more target uplink resources in response to the current uplink resource in an unavailable state but the uplink resource next to the current uplink resource in an available state.

4. The method according to claim 1, wherein the configuration indication message comprises a first predetermined value indicating an HARQ feedback information carrying number corresponding to each uplink resource, and wherein the method further comprises:

determining whether a number of pieces of HARQ feedback information carried by the uplink resource reaches the first predetermined value of the HARQ feedback information carrying number corresponding to the uplink resource;

determining that the uplink resource is in the unavailable state in response to reaching the first predetermined value; and determining that the uplink resource is in the available state in response to determining that the first predetermined value is not reached.

5. The method according to claim 1, wherein the second predetermined value is equal to a positive integer of M/N when there are M pieces of the HARQ feedback information, wherein the M is a positive integer.

6. The method according to claim 1, further comprising: determining an N-th uplink resource as the one or more target uplink resources.

7. The method according to claim 1, wherein the configuration indication message that is transmitted by the base station through radio resource control (RRC) signaling or through media access control-control element (MAC-CE) signaling is received.

8. The method according to claim 1, wherein the one or the plurality of uplink resources are physical uplink control channel (PUCCH) resources.

9. The method according to claim 1, further comprising: transmitting, by the base station, the configuration indication message to the UE; and receiving, by the base station, the HARQ feedback information transmitted by the UE on the one or more target uplink resources.

10. The method according to claim 9, further comprising generating the configuration indication message, which comprises:

acquiring a number of pieces of downlink data for which HARQs are to be fed;

acquiring a number of uplink resources suitable for feeding the HARQs; and generating the configuration indication message based on the number of pieces of downlink data and the number of uplink resources.

11. The method according to claim 9, wherein the configuration indication message is further used for a first predetermined value indicating an HARQ feedback information carrying number corresponding to each uplink resource.

12. A non-transitory computer storage medium storing computer-executable instructions, wherein the computer-executable instructions, after executed by a processor, implement the method of transmitting HARQ feedback information according to claim 1.

13. User equipment (UE), comprising:

a transceiver;

a memory; and a processor, wherein the processor is coupled to the transceiver and the memory, respectively, and is configured to execute computer-executable instructions in the memory to control wireless signal transmission/reception of the transceiver, and to implement:

receiving a configuration indication message transmitted by a base station, wherein the configuration indication message indicates a plurality of uplink resources for hybrid automatic repeat request (HARQ) feedback information;

selecting one or more target uplink resources from the plurality of uplink resources according to the configuration indication message; and feeding the HARQ feedback information to the base station through the one or more target uplink resources;

wherein there are N uplink resources within a preset configuration period, and the configuration indication message comprises a second predetermined value indicating an HARQ feedback information carrying mean corresponding to 1st to (N–1)th uplink resources, wherein the N is a positive integer, and wherein the processor is further configured to implement:

determining whether a number of pieces of HARQ feedback information carried by the uplink resource reaches the second predetermined value, determining that the uplink resource is in an unavailable state in response to reaching the second predetermined value, and determining that the uplink resource is in an available state in response to determining that the second predetermined value is not reached;

or wherein the configuration indication message comprises a third predetermined value indicating an HARQ feedback information carrying maximum corresponding to each uplink resource within the preset configuration period, and wherein the processor is further configured to implement:

determining whether a number of pieces of HARQ feedback information carried by the uplink resource reaches the third predetermined value, determining that the uplink resource is in the unavailable state in response to reaching the third predetermined value, and determining that the uplink resource is in the available state in response to determining that the third predetermined value is not reached.

14. A system of transmitting hybrid automatic repeat request (HARQ) feedback information, comprising user equipment (UE), wherein the UE comprises:

a transceiver;

a memory; and a processor, coupled to the transceiver and the memory, respectively, and configured to execute computer-executable instructions in the memory to control wireless signal transmission/reception of the transceiver, to implement:

receiving a configuration indication message transmitted by a base station, wherein the configuration indication message indicates a plurality of uplink resources for hybrid automatic repeat request (HARQ) feedback information;

selecting one or more target uplink resources from the plurality of uplink resources according to the configuration indication message; and feeding the HARQ feedback information to the base station through the one or more target uplink resources;

wherein there are N uplink resources within a preset configuration period, and the configuration indication message comprises a second predetermined value indicating an HARQ feedback information carrying mean corresponding to 1st to (N−1)th uplink resources, wherein the N is a positive integer, and wherein the processor is further configured to implement:

determining whether a number of pieces of HARQ feedback information carried by the uplink resource reaches the second predetermined value, determining that the uplink resource is in an unavailable state in response to reaching the second predetermined value, and determining that the uplink resource is in an available state in response to determining that the second predetermined value is not reached;

or wherein the configuration indication message comprises a third predetermined value indicating an HARQ feedback information carrying maximum corresponding to each uplink resource within the preset configuration period, and wherein the processor is further configured to implement:

determining whether a number of pieces of HARQ feedback information carried by the uplink resource reaches the third predetermined value, determining that the uplink resource is in the unavailable state in response to reaching the third predetermined value, and determining that the uplink resource is in the available state in response to determining that the third predetermined value is not reached.

15. The system according to claim 14, further comprising the base station, wherein the base station comprises:

a second transceiver;

a second memory; and a second processor, coupled to the second transceiver and the second memory, respectively, and configured to execute computer-executable instructions in the second memory to control wireless signal transmission/reception of the second transceiver, to implement:

transmitting the configuration indication message to the UE, and receiving the HARQ feedback information transmitted by the UE on the one or more target uplink resources.

* * * * *